United States Patent
Tepera et al.

(10) Patent No.: US 7,215,833 B1
(45) Date of Patent: May 8, 2007

(54) METHOD OF MATCHING A DIGITAL CAMERA IMAGE TO A DATABASE USING A TIMESTAMP DEVICE

(75) Inventors: Ed J. Tepera, Monroe, NC (US); Benjamin L. Gatti, Indian Trail, NC (US)

(73) Assignee: Digital Photography Innovations, Inc., Charlotte, NC (US)

( * ) Notice: Subject to any disclaimer, the term of this patent is extended or adjusted under 35 U.S.C. 154(b) by 873 days.

(21) Appl. No.: 10/371,096

(22) Filed: Feb. 21, 2003

Related U.S. Application Data

(60) Provisional application No. 60/358,613, filed on Feb. 21, 2002.

(51) Int. Cl.
*G06K 9/54* (2006.01)
*G06K 9/60* (2006.01)

(52) U.S. Cl. .................... 382/306; 382/305
(58) Field of Classification Search ........... 382/305, 382/306; 348/231.5, 371, 155, 231.6
See application file for complete search history.

(56) References Cited

U.S. PATENT DOCUMENTS 4,941,125 A  7/1990  Boyne
5,864,128 A *  1/1999  Plesko .................... 235/462.35
6,466,934 B2  10/2002  Seese et al.
6,928,230 B2 *  8/2005  Squibbs ........................ 386/46

\* cited by examiner

*Primary Examiner*—Jingge Wu
*Assistant Examiner*—Wes Tucker
(74) *Attorney, Agent, or Firm*—Ralph H. Dougherty

(57) ABSTRACT

The invention is a method for correlating and assigning digital camera images to a database file. The method enables a photographer to keep track of large numbers of subjects and items. The method uses a timestamp from a bar code reader to synchronize recorded swipes of bar codes with the digital images created produced by the camera. The bar code reader is used to swipe identifying bar code on items or subjects that are to be tracked, such as on a student's camera card, a police investigation report or a catalogue item. The time and the bar code serve as a means to cross-reference any item or subject to the digital images. The photographs and bar code scans are downloaded into a computer, and then by inspection of the recorded times of when the scans were made and the pictures were taken, the images can be assigned to the appropriate file. The images can then be loaded into the item's or subject's file, secure in the knowledge that the images are appropriately assigned.

11 Claims, 3 Drawing Sheets

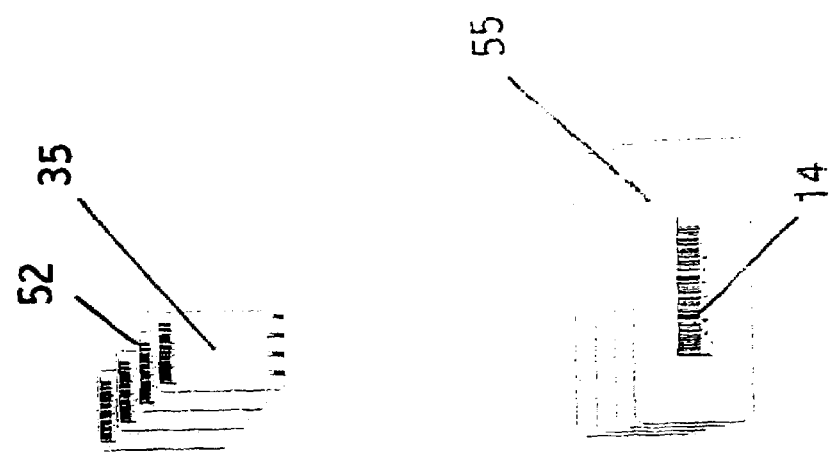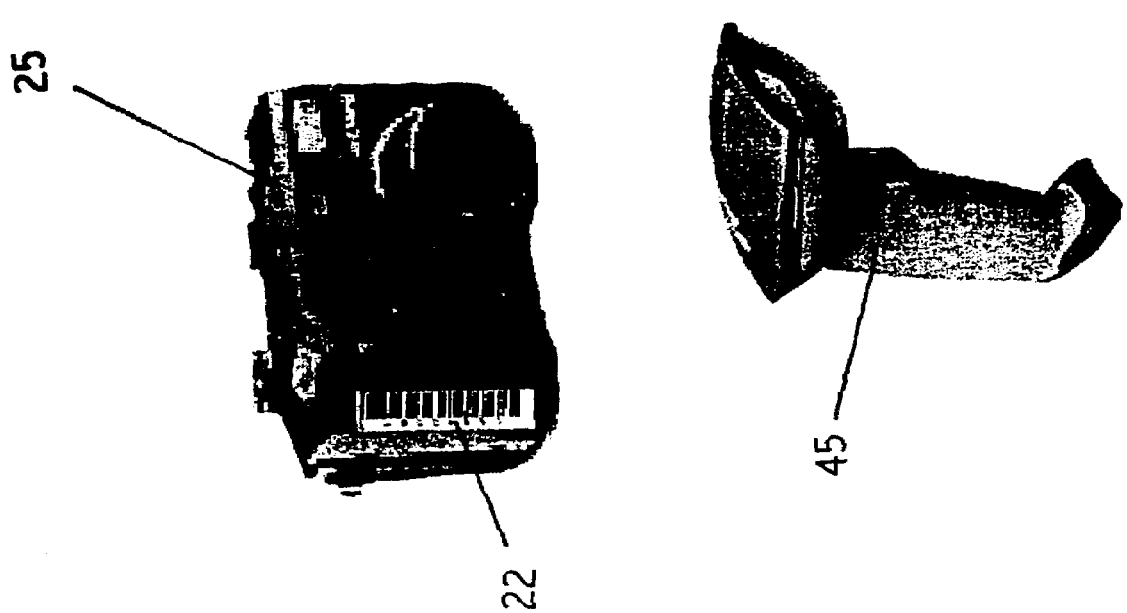
Fig. 3

METHOD OF MATCHING A DIGITAL CAMERA IMAGE TO A DATABASE USING A TIMESTAMP DEVICE

CROSS REFERENCE TO RELATED APPLICATIONS

The application claims the benefit of U.S. Provisional Application No. 60/358,613, filed on Feb. 21, 2002.

FIELD OF THE INVENTION

The invention relates to general digital photography and more particularly to a method for tracking and storing a digital photographic image in a database.

BACKGROUND OF THE INVENTION

Schools and other governmental organizations commonly employ digital photography to generate photo IDs. Photo IDs are used by the school to identify which students should be on the school premises, to help the students with their socialization and adaptation to the school, to aid in name recognition, and to facilitate a variety of administrative functions. In another application, the highway department uses IDs to identify drivers who are approved licensed drivers of a vehicle. Another example of photo ID use is in companies, particularly large companies and governmental agencies, to enhance security, wherein access to the facility is controlled through the wearing of photo identification.

In the case of schools, student identification cards have to be generated every year, and preferably with minimum disruption to the class day. Each student has a database associated with that student, listing things such as class, home room number, social security number, birth date, etc. Also, associated with the student is a photographic image of the student. The conventional way of generating a photographic image and matching that image with the student is as follows: the school provides a selected organization with a database of all the students. The selected organization then uses this database to create camera cards. Each student has one camera card. In a photography shoot the photographer has a digital camera that is electronically tethered to a computer. The computer, which is usually a laptop, has been previously loaded with the database information needed to generate camera cards for the students. The camera cards are distributed to the students who then present their individual camera cards to the photographer at the beginning of the shoot. The student gives the card to the photographer who swipes the camera card. The card has an electromagnetic strip. After reading the camera card, the computer brings up the student's database file. The photographer then takes one or more pictures of the student. As the photos are taken the images are transferred to the LCD screen of the laptop computer and downloaded onto the database of the computer. The photographer has an opportunity to view the images, and the student may also have an opportunity to view the photos. All of the images are associated with that particular student's file. A new shoot begins when the next student's camera card is swiped into the computer, thus beginning the process anew.

This method has several advantages. It generates instant pictures. The photographer and student are able to view the image. The image is associated with the student's database file, and there is little chance that the image will be associated with the wrong individual, as the student can quickly see that the pictures are associated with his name. There are some serious negatives to this process, and many of these negatives are a consequence of the fact that a laptop computer is required for each camera. Laptop computers are expensive. Like the camera, they are battery powered and subject to failure. The photographer not only has to be proficient in photography, but also must be proficient in operating the computer. On a practical level, in judging the amount of disruption caused by the photographic session, the fact that the student can view the photos tends to slow the entire process. Disruption and delays are contrary to the wishes of the school administration, and are to be minimized, even at the expense of the student's desire to have "just one more picture taken".

Schools and other organizations are seeking a method that is very similar to what they are used to doing, that is, shooting the pictures and developing them offsite. What is needed is a method for matching photographic images created by the digital camera to the subject (or item), where the matching process is independent of the laptop. Another advantage of maintaining autonomy of the digital camera from the laptop or any computer is that the software on computers is regularly changing, and maintaining compatibility between the digital cameras and the software running on the laptop is an ongoing issue.

What is needed is a method for matching digital photographic images to the database, wherein there is no necessity for a laptop, or other computer, to be tethered to the digital camera during the shoot.

The prior art teaches has several methods of organizing and tracking digital images. Walter Boyne, in U.S. Pat. No. 4,941,125 discloses a method for imputing images from a digital camera into a computer, where the data is indexed for easy retrieval at a later date. The patent is principally concerned with archiving documents. The method utilizes optical character recognition software to convert the images into text, and then generate an index of descriptive terms to index the images. Boyne does not teach the utility of a method, wherein the camera is not tethered to a computer.

In U.S. Pat. No. 6,466,934, Seese et al. use bar code readers, which are generally referred to as "external systems", to provide an interface without the need of an in-depth understanding of the database model. A first external system and a second external system provide for responding to an event, the event being related to communication with at least one of the first or the second external systems, and receiving a message, the message comprising a metadata event key and a session identifier, the session identifier identifying a workset database for use with the message, the workset database having a workset database structure dependent upon metadata; and processing an action series dependent upon the metadata event key. In other words, Seese '934 teaches that bar code readers can be used to trigger a second external system. Seese '934 does not teach that the bar code reader can be used to organize data.

OBJECT OF THE INVENTION

The principal object of the present invention is to provide an improved method of correlating digital photographic images to a preloaded database without requiring the use of a computer.

A second object of the invention is to obviate the need for a computer, such as a notebook or laptop computer, to be tethered to the camera during the photography session.

A third object of the invention is to create an environment during the photography session that is expeditious and not disruptive to a school environment.

A fourth object of the invention is that the method enables a photographer to keep track of digital images for a large numbers of subjects or items.

SUMMARY OF THE INVENTION

The invention is a method for matching digital camera images to a unique entry in a database, where a unique entry would be, for instance, a social security number, a name, a bar code, etc., for a student or an individual. Furthermore, the invention is a method for correlating data in the form of a digital photographic image to a unique identifier (UID) in a database. The method enables a photographer to keep track of large numbers of images. The method uses a timestamp of a bar code scanner to synchronize and record events/digital images with the database. Before describing the method in detail a little background on digital camera images and bar code scanners is required. Bar code scanners, such as the OzE Wand, record the bar code and the time at which the bar code was read. The OzE Wand bar code scanner is portable. The collected data can be downloaded into the computer at a later time. Digital cameras create a timestamp that is associated with each digital image. The timestamp is simply the time, usually recorded with an accuracy within one second.

The invention is a method of matching digital image data generated by a digital camera to a file in a database. About or just prior to the time when a collection of digital pictures is to be taken a bar code scanner is used to swipe a bar code, therein recording the bar code and a bar code timestamp, and the digital camera is used to take an initializing image therein recording an image having an image timestamp. The bar code is a unique identifier that is associated (or is to become associated) with a collection of images stored in a database. The camera images and the bar code data are loaded into a database, wherein the image timestamp and the bar code timestamp serve in effect as a primary reference index that enables a collection of image data associated with subjects or items to be synchronized with a particular bar code data.

In an example of an application of the method, a police evidence log containing a column of bar codes, each of which has one or more rows of comments or observations, the method can be used to keep track of pictures shot at a crime scene. Each of the bar codes and the associated rows are stored in a database. The picture(s) are to be associated with a bar code. The bar codes can be associated with one or more investigations. The photographer at the scene will swipe the bar code with the bar code reader at about the time he is going to being taking pictures. There can be one bar code for each picture or several pictures. To assure the chain of evidence is properly choreographed and recorded, typically the photographer would swipe the bar code for each picture. The digital camera images and the bar code data are loaded into a database, wherein the image timestamp and the bar code timestamp serve in effect as a primary reference index that enables the image data to be synchronized with a particular bar code data.

In second example, the same method can be adapted to keep track of digital images for items that are to be in a catalogue. The items, which have an identifying bar code, are photographed and swiped, and then the bar code data and the image data are then loaded into a database. The bar code timestamp and image timestamp are compared and the images are matched to the bar codes.

To illustrate the utility and the diversity of the method, a third example illustrates how the method can be employed to keep track of large numbers of images for subjects, as can be the case with school photographic shoots. The school provides the selected photography organization with the database of the students. The selected organization then generates an identifying bar code for each subject, where the subject is a student and the bar code is imprinted on a camera card for each student. The bar code on the camera card is a unique identifier of the student. The digital media is usually a PCMCI card, memory stick, or compact disc. The digital media stores digital images and timestamps each digital camera image at the time the picture is taken. As with the laptop system, the student having received his disbursed camera card presents the camera card to the photographer, who then wands the bar code on the camera card. The photographer takes as many photographs as required to complete the work. The digital camera is equipped with an LCD, which allows the photographer to quickly determine the quality of the photograph. However, in contrast to the laptop, the image will not be observable to the individual being photographed, unless so desired by the photographer. The next shoot begins with the presentation of the next camera card, which is swiped by the wand, records the bar code and the timestamp of the swipe. As before, the photographer takes as many pictures as required to complete the photography session for the subject. The process continues until the photography session is completed. Each of the photos will be associated with just one camera card.

The method can be slightly modified to create additional tracking and control elements. In setting up for the photography shoot, the photographer can assign/create a bar code for the digital media and for the digital camera. At the beginning of the shoot the photographer wands the digital camera bar code and wands the digital memory media. The digital memory media is quickly loaded into the camera and a time synchronizing picture is taken, which establishes the beginning time of the shoot. The process continues as previously described until the digital memory medium is filled. At this point, the next digital memory card, having its own unique bar code, is wanded and loaded into the camera. The process continues until the photography session is completed. The photographer now has a record of not only which images were shot, but also with what camera and which memory media, so that if a problem develops, the photographer can easily identify the source of the problem.

Following the session, the photographer or selected photography organization uploads the digital memory media containing the digital image files and bar code data from the bar code scanner, such as OzE Wand, into a computer. The timestamp of the metadata of a given digital image file is compared and matched with the timestamp for a given UID. Based on the results of the query the image file is affiliated with the UID of the student presenting the camera card, and the image file for the student can subsequently be added to the student's database record.

BRIEF DESCRIPTION OF THE DRAWINGS

FIG. 3 illustrates a bar code scanner and a digital camera, camera cards and memory media, wherein each are fitted with bar codes.

DETAILED DESCRIPTION

Figure 1:
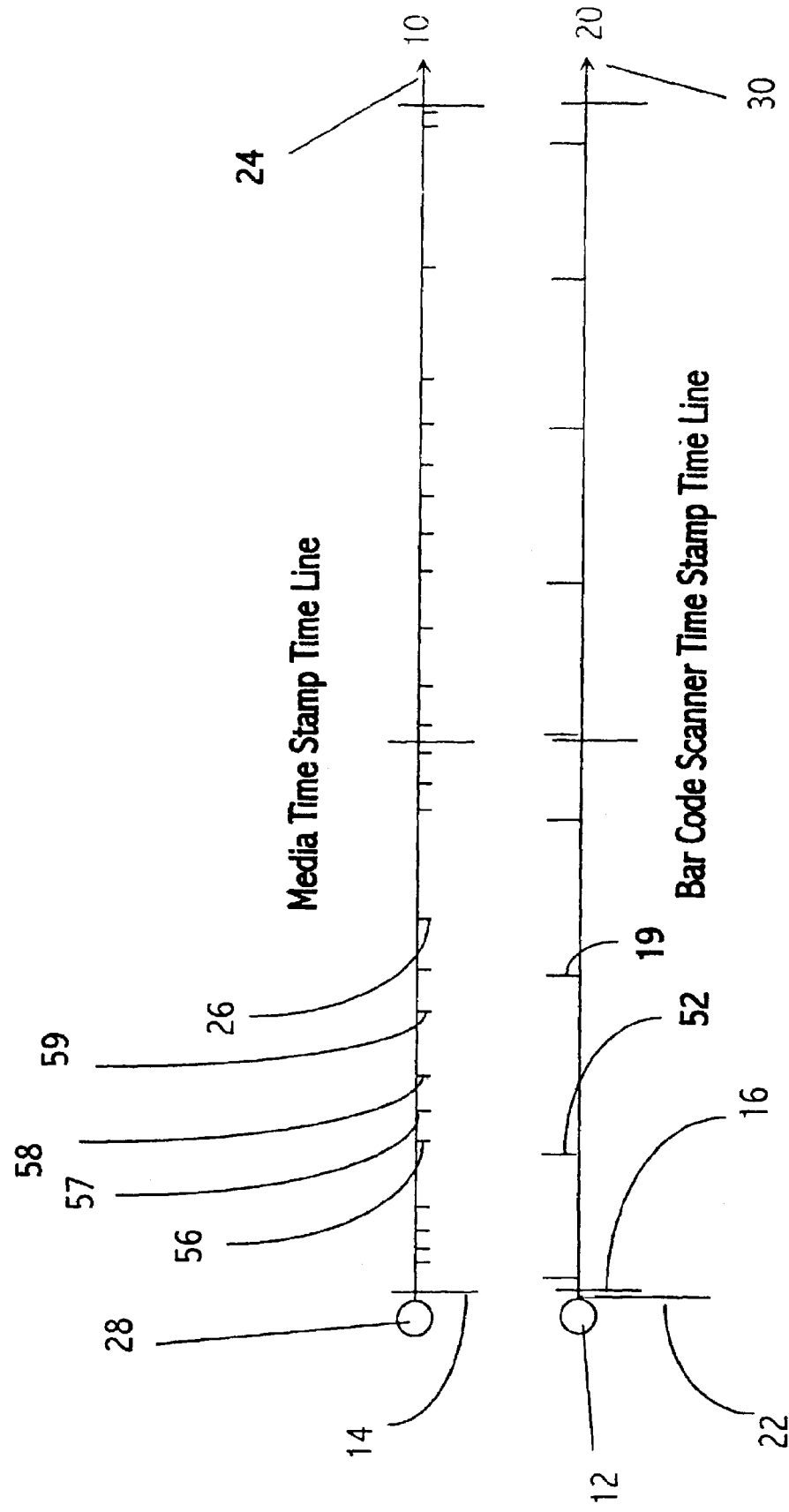
FIG. 1 is a diagrammatic illustration showing the timeline for the bar code scanner data and the memory media data.

A method of generating and matching digital photographic image data generated by a digital camera to a file loaded in a database, where the file has a unique identifier (UID) for a subject, said method comprising: a) providing a digital camera that records an image timestamp with every digital photographic image with a camera bar code, at least one digital memory medium with a media bar code, and a unique camera card with a card bar code for each subject; b) providing a portable bar code scanner that records the bar code and a scanner timestamp with each scan; c) scanning the camera bar code, therein recording the camera bar code and the camera timestamp; d) scanning the media bar code, therein recording the media bar code and a media timestamp; e) taking a time synchronizing picture; f) scanning the card bar code, therein recording the card bar code and a card timestamp; g) shooting the digital photographic image that is to be assigned to the subject; h) repeating step g until sufficient number of images for the subject are collected, or if memory medium is full, going to step j; i) repeating steps f through i until all digital photographic images of all subjects are taken, then proceeding to step k; j) scanning the media bar code of another digital memory medium, therein recording the unique media bar code and a media timestamp, and then going to step f; k) transferring data recorded by the bar code scanner and the memory medium to database files creating a bar code timestamp timeline and a memory media timestamp timeline; and l) correlating data from the recorded bar code timestamp timeline to the recorded memory media timestamp timeline, and assigning appropriate digital photographic image to the file for the subject having the matching UID.

Referring to FIG. 3, the digital camera 25 is labeled with a bar code 22, that uniquely identifies the camera. Each of PCMCI cards, memory media 35, are also labeled with a bar code 52 that uniquely identifies the PCMCI card. Camera cards 55 are prepared from the database, such that each camera card has a unique bar code 14.

FIG. 1 is a diagrammatic illustration showing the timeline for the bar code scanner data and the memory media data. The timeline for bar code reader 20 begins at 12, which is at time zero, and ends at 20, which is the end of the session. The largest line on the bar code scanner timestamp timeline is 22. Line 22 represents the bar code information gathered when the bar code on the camera is read. This is the first event on the bar code timeline as is shown by its relative position on the line. The next event on the bar code timeline is indicated by 16, which represents when the bar code on the memory media is scanned. The reader is reminded that the media bar code is scanned just prior to shooting the first picture. Turning our attention to the media timestamp timeline 14, this line schematically illustrates the data stored in the memory media for that first picture. Notice that 14 and 16 occur at very close to a the same time. The bar code scanner and the media timeline can be synchronized according to the relative positions of 16 and 14, so that both occur at a relative position time zero, where time zero is designated 12 for the bar code reader and 28 for the media timeline. The individual pictures of the student/subject are represented by 26 on the media timeline.

Now turning our attention to tick mark 52 on the bar code scanner timeline 20, tick mark 52 represents the data collected by the bar code reader. The data includes a bar code unique to that particular camera card and the timestamp of when the camera card is wanded. Moving across to the media timestamp line, the reader can see that there are four ticks 56, 57, 58 and 59 on the timestamp line before the next large line 19 on the bar code scanner timeline. These four ticks 56, 57, 58 and 59 correspond to four pictures taken of the individual bearing camera card 52.

Figure 2:
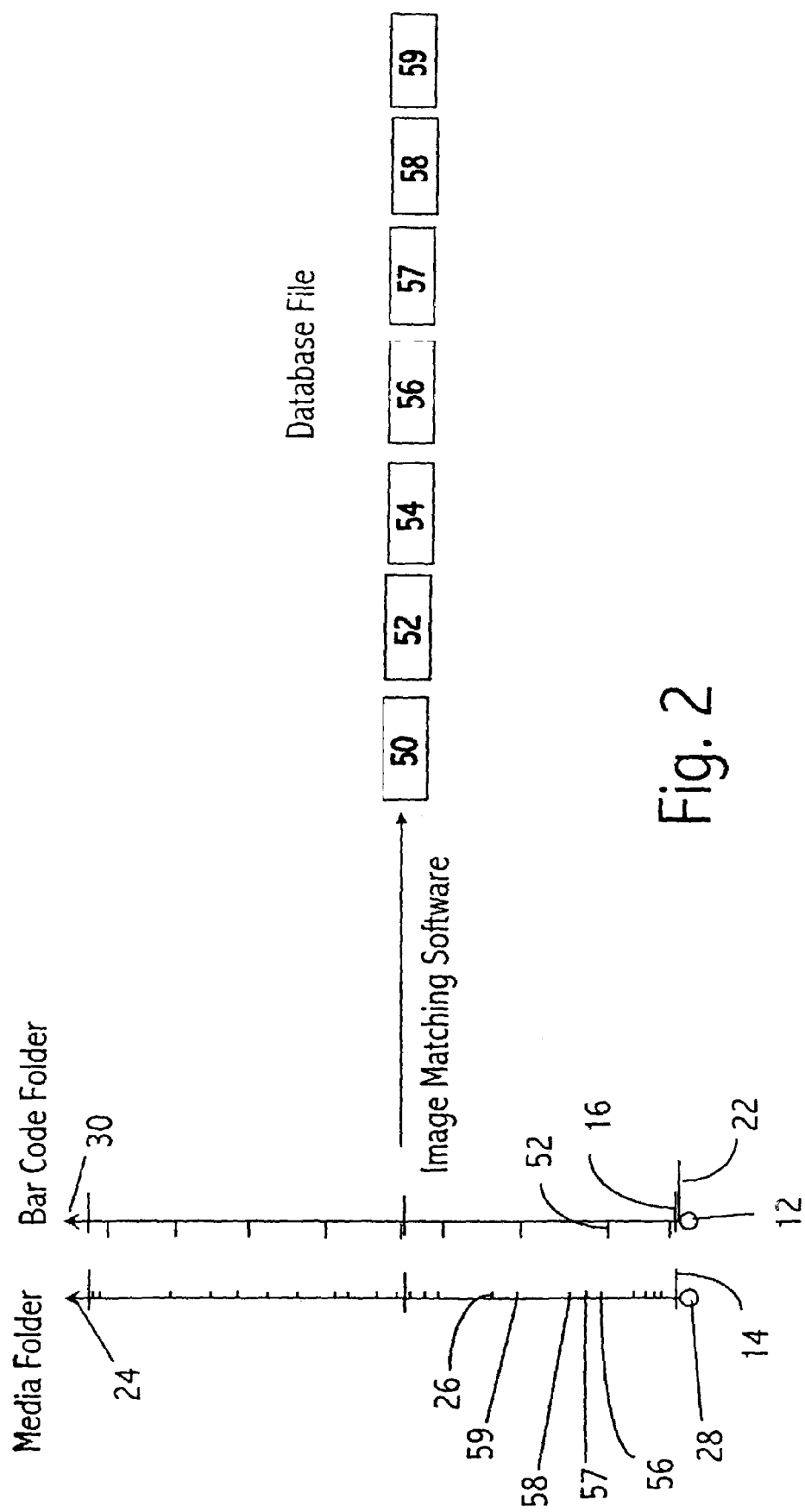
FIG. 2 is a schematic diagram showing how the information gathered by the bar code scanner and the media is stored in the computer and then analyzed.

FIG. 2 is schematic diagram showing how the information gathered by the bar code scanner and the media is stored in the computer and then analyzed. The bar code scanner and the memory media data have been downloaded into the computer in their individual folders. The database file on the right shows five boxes, but there could be many more. Each box schematically represents a packet of data in the database file. The first box 50 is a unique number for the student/subject having a camera card 52, who in this case was a student. In many cases the unique number or ID (UID) is probably the student's social security number. Box 52 indicates the bar code that was generated by the previous operation for preparing an identifying bar code mark on the camera card. Box 54 is the student's name. Box 56 is the data for the first photo, box 57 is the data for the second photo, box 58 is the data for the third photo, and box 59 is the data for the fourth photo. Now, looking over at the media folder timeline there are four ticks, 56, 57, 58 and 59 before we reach another tick on the bar code folder timeline. This means that four pictures were taken for the student presenting camera card 52, which has been previously identified as associated with the student name 54 having UID 50.

In applicant's invention, the imaging method software searches through the raw data in the bar code folder and the media folder until it finds a corresponding data image associated with camera card 52. The timeline uses a time synchronizing picture to correlate the memory media timeline to the bar code scanner timeline, and then brackets, using the range of time, the camera card associated with a student. Similarly, the photos assigned to that camera card are marked by time, and/or the timestamping of another camera card.

It is anticipated that many digital cameras meta data, and the meta data can contain audio data generated by a microphone on the camera. A second unique identifier (UID) such as an audio version of the subject's name or social security number could be generated when the digital photographic image is taken by audio recording the second UID. The audio UID would act to augment the method described above. The meta data could be used as an independent confirmation that cross-references the images to additional data preloaded in the database.

SUMMARY OF THE ACHIEVEMENT OF THE OBJECTS OF THE INVENTION

From the foregoing, it is readily apparent that I have invented an improved method of matching digital photographic images to subjects in a preloaded database without requiring the use of a computer, where said method is simpler, faster and more economical than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A method of generating and matching digital photographic image data generated by a digital camera to a file loaded in a database, where the file has a unique identifier (UID) for a subject or an item, said method comprising:
   a) providing a digital camera that records an image timestamp with every digital photographic image with a camera bar code, at least one digital memory medium with a media bar code, and an identifying bar code for each subject or item;
   b) providing a portable bar code scanner that records the bar code and a scanner timestamp with each scan;
   c) scanning the camera bar code, therein recording the camera bar code and the camera timestamp;
   d) scanning the media bar code, therein recording the media bar code and a media timestamp;
   e) taking a time synchronizing picture;
   f) scanning the identifying bar code, therein recording the identifying bar code and an identifying timestamp;
   g) shooting the digital photographic image that is to be assigned to the subject or the item;
   h) repeating step g until sufficient number of images for the subject are collected, or if memory medium is full, going to step j;
   i) repeating steps f through i until all digital photographic images of all subjects are taken, then proceeding to step j;
   j) transferring data recorded by the bar code scanner and the memory medium to database files creating a bar code timestamp timeline and a memory media timestamp timeline; and
   k) correlating data from the bar code timestamp timeline to the memory media timestamp timeline, and assigning appropriate digital photographic image to the file for the subject having the matching UID.

2. A method of generating and matching digital photographic image data according to claim 1, further comprises using a digital camera that additionally records audio meta data, wherein the audio meta data is a second UID associated with the digital photographic image that can be used as a means of confirming synchronized data.

3. The method of generating and matching digital photographic image data according to claim 1, wherein the memory media is selected from the memory devices consisting of: PCMCI cards, floppy discs, memory sticks, and compact discs.

4. The method of generating and matching digital photographic image data according to claim 1, wherein the portable bar code reader is an OzE Wand.

5. A method of generating and matching digital photographic image data generated by a digital camera to a file loaded in a database, where the file has a unique identifier (UID) for a subject or an item, said method comprising:
   a) providing a digital camera that records an image timestamp with every digital photographic image, at least one digital memory medium, and an identifying bar code for each subject or item;
   b) providing a portable bar code scanner that records the bar code and a scanner timestamp with each scan;
   c) taking a time synchronizing picture;
   d) scanning the identifying bar code, therein recording the identifying bar code and an identifying timestamp;
   e) shooting the digital photographic image that is to be assigned to the subject or the item;
   f) repeating step e until sufficient number of images for the subject are collected, or if memory medium is full, going to step g;
   g) repeating steps d through f until all digital photographic images of all subjects are taken, then proceeding to step i;
   h) scanning the media bar code of another digital memory medium, therein recording the unique media bar code and a media timestamp, and then going to step f;
   i) transferring data recorded by the bar code scanner and the memory medium to database files creating a bar code timestamp timeline and a memory media timestamp timeline; and
   j) correlating data from the bar code timestamp timeline to the memory media timestamp timeline, and assigning appropriate digital photographic image to the file for the subject having the matching UID.

6. A method of generating and matching digital photographic image data according to claim 5, further comprises using a digital camera that additionally records audio meta data, wherein the audio meta data is a second UID associated with the digital photographic image that can be used as a means of confirming synchronized data.

7. The method of generating and matching digital photographic image data according to claim 5, wherein the memory media is selected from the memory devices consisting of: PCMCI cards, floppy discs, memory sticks, and compact discs.

8. The method of generating and matching digital photographic image data according to claim 5, wherein the portable bar code reader is an OzE Wand.

9. The method of generating and matching digital photographic image data according to claim 5, wherein the identifying bar code for each subject or item is a camera card.

10. The method of generating and matching digital photographic image data according to claim 1, wherein the identifying bar code for each subject or item is a camera card.

11. Apparatus for matching digital photographic images as claimed in claim 1, wherein said wherein the identifying bar code for each subject or item is a camera card.

* * * * *